(12) United States Patent
Nakajima

(10) Patent No.: US 11,077,722 B2
(45) Date of Patent: Aug. 3, 2021

(54) TIRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 241 days.

(21) Appl. No.: 16/275,443

(22) Filed: Feb. 14, 2019

(65) Prior Publication Data

US 2019/0263193 A1    Aug. 29, 2019

(30) Foreign Application Priority Data

Feb. 28, 2018  (JP) .............................. JP2018-034039

(51) Int. Cl.
    *B60C 13/00*   (2006.01)
(52) U.S. Cl.
    CPC ................................... *B60C 13/001* (2013.01)
(58) Field of Classification Search
    CPC .............................. B60C 13/001; B60C 13/02
    See application file for complete search history.

(56) References Cited

U.S. PATENT DOCUMENTS

| | | | | |
|---|---|---|---|---|
| 2006/0032569 | A1* | 2/2006 | Zimmer | G09F 7/165 152/524 |
| 2008/0283169 | A1* | 11/2008 | Sato | B60C 13/001 152/450 |
| 2010/0051159 | A1* | 3/2010 | Fujioka | B60C 13/001 152/523 |
| 2012/0227879 | A1* | 9/2012 | Muhlhoff | B23K 26/36 152/151 |
| 2018/0099530 | A1* | 4/2018 | Yonetsu | B29D 30/72 |
| 2019/0202244 | A1* | 7/2019 | Okamatsu | C08K 3/04 |

FOREIGN PATENT DOCUMENTS

| | | |
|---|---|---|
| JP | 9-86106 A | 3/1997 |
| JP | 3652809 B2 * | 5/2005 |

* cited by examiner

*Primary Examiner* — Jacob T Minskey
*Assistant Examiner* — Virak Nguon
(74) *Attorney, Agent, or Firm* — Greenblum & Bernstein, P.L.C.

(57) ABSTRACT

A mark indicating portion provided on a sidewall portion comprises a reference surface provided on a surface of the sidewall portion and marks formed on the reference surface. A surface of each mark 4 includes a first inclined surface portion having a height from the reference surface increasing outwardly in a tyre radial direction from an inner end in the tyre radial direction, and a second inclined surface portion having a height from the reference surface increasing inwardly in the tyre radial direction from an outer end in the tyre radial direction.

20 Claims, 5 Drawing Sheets

TIRE

TECHNICAL FIELD

The present invention relates to a tyre having improved legibility of a mark provided on a sidewall portion.

BACKGROUND ART

On a surface of at least one of the sidewall portions of the tyre, one or marks which are letters, symbols, and the like indicating the manufacturer name, brand name, size, and the like of the tyre are formed. And in order to improve the legibility of the marks, for example, the marks are formed to be one step higher than the surface of the sidewall portion, and ridges are provided on the surfaces of the marks (for example, see Japanese Unexamined Patent Application Publication No. H9-86106).

SUMMARY OF THE INVENTION

However, conventional marks have a constant height, therefore, even when a ridge is formed on the surface thereof, they have monotonous appearance and little change in contrast. Thereby, the legibility cannot be sufficiently improved.

An object of the present invention is to provide a tyre capable of improving design by providing a change in the appearance of the marks and capable of improving the legibility of the marks by giving contrast between the surfaces of the marks and their reference surface.

In one aspect of the present invention, a tyre comprises a sidewall portion provided with a mark indicating portion having one or more marks, wherein the mark indicating portion comprises a reference surface provided on a surface of the sidewall portion and the marks formed on the reference surface, and a surface of the or each mark includes a first inclined surface portion having a height from the reference surface increasing outwardly in a tyre radial direction from an inner end thereof in the tyre radial direction, and a second inclined surface portion having a height from the reference surface increasing inwardly in the tyre radial direction from an outer end thereof in the tyre radial direction.

In another aspect of the invention, it is preferred that a length (La) in the tyre radial direction of the first inclined surface portion is in a range of from 0.8 to 1.2 times a length (Lb) in the tyre radial direction of the second inclined surface portion.

In another aspect of the invention, it is preferred that in the mark indicating portion, either the reference surface or the surface of the or each mark is provided with a plurality of small protruding portions.

In another aspect of the invention, it is preferred that each of the small protruding portions is a truncated conical protrusion having a smaller diameter on a side of an upper end thereof.

In another aspect of the invention, it is preferred that each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

In another aspect of the invention, it is preferred that each of the small protruding portions is a rib-shaped protrusion having a trapezoidal cross section with a thickness thereof decreasing toward an upper end thereof, and the rib-shaped protrusions are arranged parallel to each other or in a non-parallel manner.

In another aspect of the invention, it is preferred that each of the rib-shaped protrusions has a maximum thickness in a range of from 20 to 1000 micro meters and a protruding height in a range of from 200 to 500 micro meters, and a distance between the rib-shaped protrusions adjacent to each other is in a range of from 10 to 800 micro meters.

In another aspect of the invention, it is preferred that the mark indicating portion is provided with a base portion projecting from the surface of the sidewall portion at a constant height, and a surface of the base portion forms the reference surface.

In another aspect of the invention, it is preferred that a maximum height of the surface of the or each mark from the reference surface is larger than the height of the base portion from the surface of the sidewall portion.

DESCRIPTION OF THE PREFERRED EMBODIMENT

An embodiment of the present invention will now be described below in detail.

Figure 1:
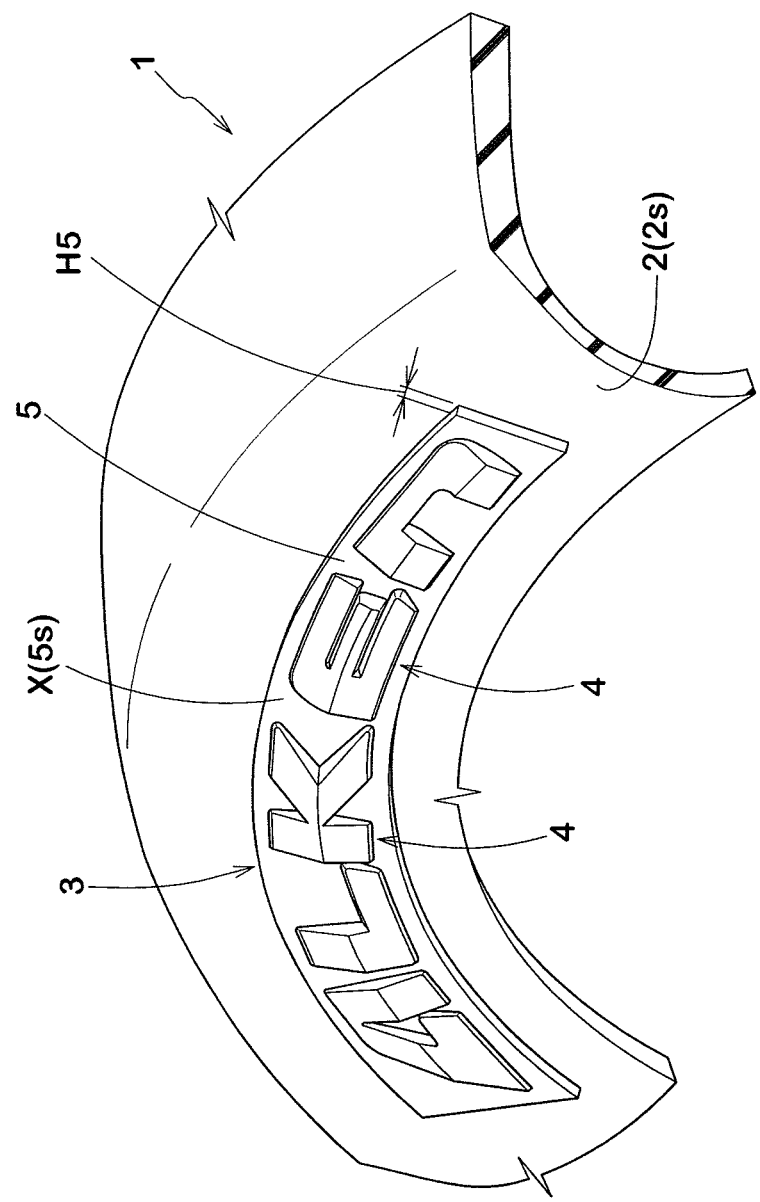
FIG. 1 is a partial perspective view of a tyre according to an embodiment of the present invention.

As shown in FIG. 1, a tyre 1 in this embodiment is provided with one or more mark indicating portions 3 in at least one of sidewall portions 2.

Each of the mark indicating portions 3 is provided with a reference surface (x) provided on a surface (2s) of a respective one of the sidewall portions 2 and one or more marks 4 formed on the reference surface (x). In this embodiment, each of the mark indicating portions 3 is provided with a base portion 5 which projects stepwise from the surface (2s) of a respective one of the sidewall portions 2 at a constant height (H5) (that is, a top surface of the base portion is not inclined with respect to the surface (2s)) and a surface (5s) of the base portion 5 forms the reference surface (x).

Each of the marks 4 is a letter, a symbol, a figure, and the like for representing the manufacturer name, brand name, size, and the like of the tyre, and in this embodiment, a case is shown in which a brand name consisting of a plurality of the marks 4 is formed on the reference surface (x).

Figure 2:
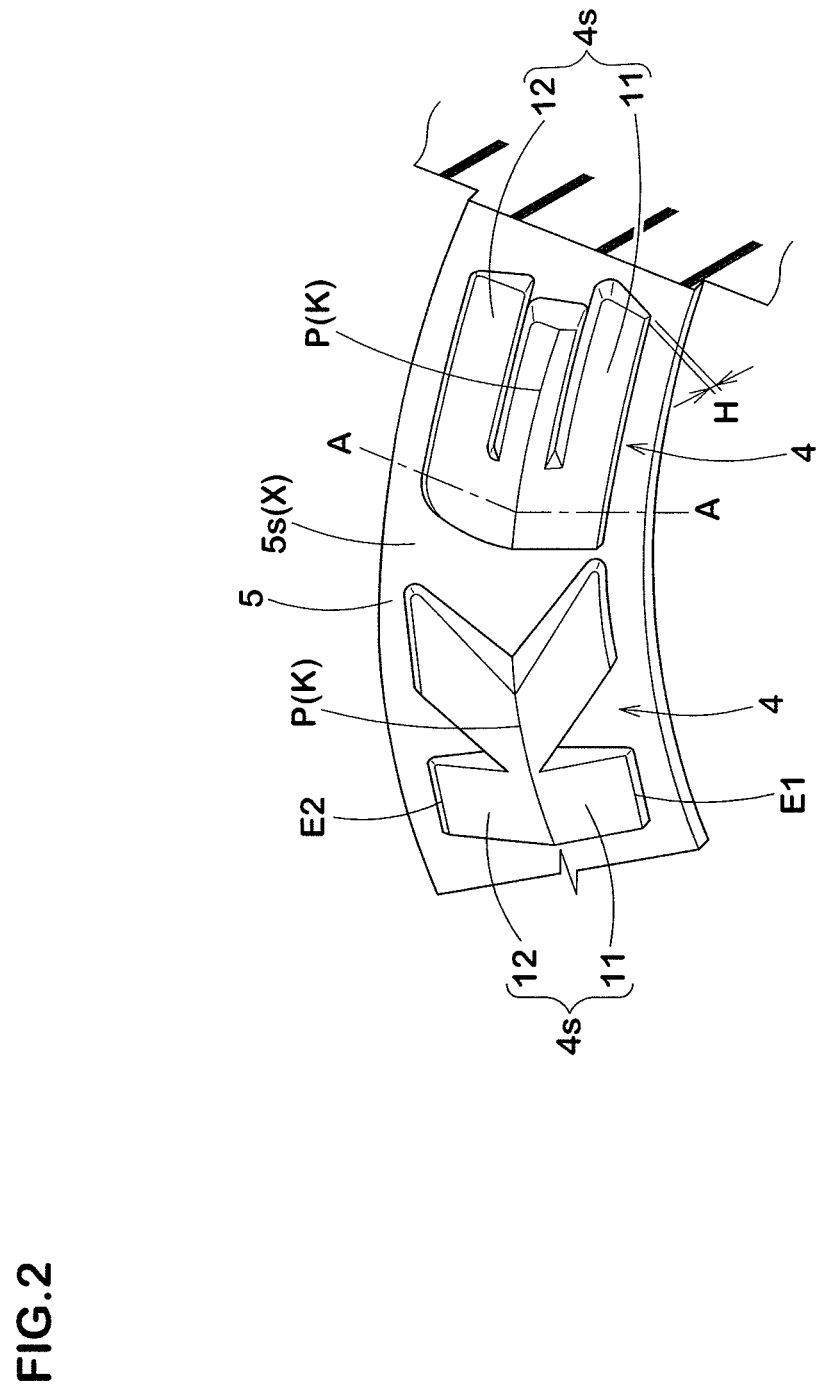
FIG. 2 is an enlarged partial perspective view of marks.
Figure 3:
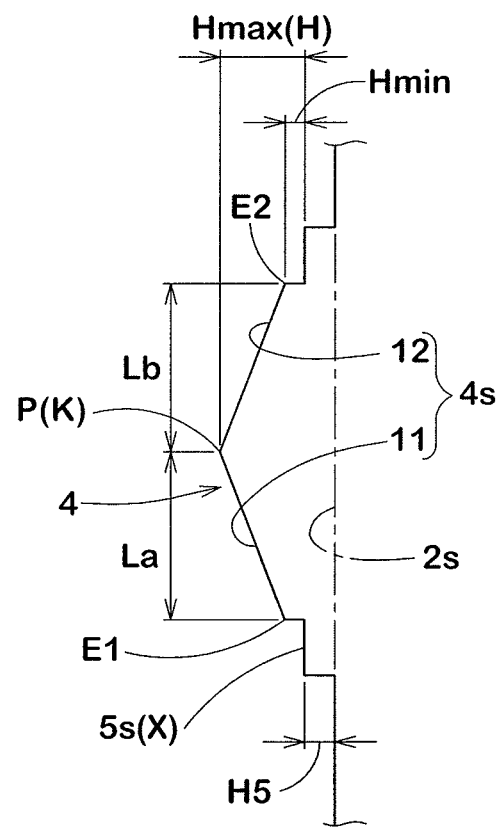
FIG. 3 is an enlarged cross-sectional view of one of the marks taken along A-A line of FIG. 2.

As shown in FIGS. 2 and 3, a surface (4s) of each of the marks 4 includes a first inclined surface portion 11 disposed inward in a tyre radial direction and a second inclined surface portion 12 arranged outwardly in the tyre radial direction.

The first inclined surface portion 11 is inclined such that a height (H) thereof from the reference surface (x) increases radially outwardly from an inner end (E1) in the tyre radial direction of the surface (4s). The second inclined surface portion 12 is inclined such that the height (H) thereof from the reference surface (x) increases radially inwardly from an outer end (E2) in the tyre radial direction of the surface (4s).

In this example, a case in which the surface (4s) of each of the marks 4 is formed by the first and the second inclined surface portions 11 and 12 is shown. Thereby, a top portion (P) of the surface (4s) is formed by a ridge line (K) where the first inclined surface portion 11 and the second inclined surface portion 12 intersect.

In this embodiment, the ridge line (K) is curved in an arc shape with a tyre axis as a center thereof. In particular, it is preferred that the ridge lines (K) of the plurality of the marks 4 which is arranged within the same mark indicating portion 3 are positioned on one circumferential line around the tyre axis.

As described above, the surface (4s) of each of the marks 4 has the first and the second inclined surface portions 11 and 12 which are inclined in opposite directions, therefore, a change is given to appearance of the marks 4, thereby, it is possible that the design is improved. Further, a manner of reflection of light is different between the first inclined surface portion 11 and the second inclined surface portion 12, therefore, it is possible that stereoscopic effect of the marks 4 is emphasized while an increase in weight and air resistance is suppressed. Furthermore, there is a large difference in contrast depending on the viewing direction, therefore, it is possible that the legibility is improved by synergistic effect of these.

As shown in FIG. 3, it is preferred that a length (La) in the tyre radial direction of the first inclined surface portion 11 is in the range of from 0.8 to 1.2 times a length (Lb) in the tyre radial direction of the second inclined surface portion 12. If the above range is not satisfied, the effect described above tends to be decreased.

It is preferred that a maximum height (Hmax) of the surface (4s) of each of the marks 4 from the reference surface (x) is larger than the height (H5) of the base portion 5 from the surface (2s) of each of the sidewall portions 2 from a point of view of the legibility. Note that it is preferred that a minimum height (Hmin) of the surface (4s) of each of the marks 4 from the reference surface (x) is not more than the height (H5) of the base portion 5 from a point of view of suppressing an increase in air resistance.

It is also possible that a middle surface portion (not shown) having a small width and parallel to the reference surface (x) is interposed between the first inclined surface portion 11 and the second inclined surface portion 12, for example. In this case, it is preferred that a width in the tyre radial direction of the middle surface portion is not more than 0.2 times a length in the tyre radial direction of the entire surface (4s).

Further, it is preferred that each of the first and the second inclined surface portions 11 and 12 is a flat surface, however, they may be curved surfaces extending in a curved manner in an arc shape in the tyre radial direction, for example.

Figure 4A:
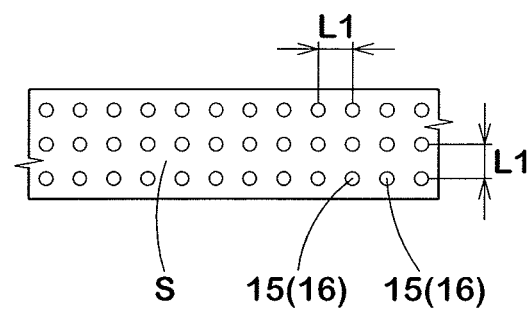
FIG. 4A is a partial plan view showing an arrangement of small protruding portions formed as truncated conical protrusions.
Figure 4B:
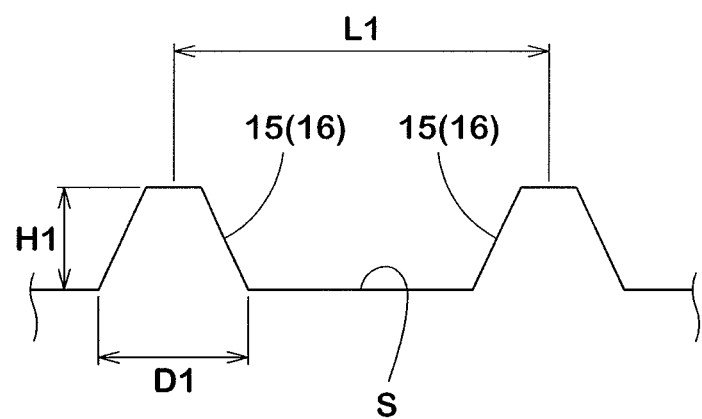
FIG. 4B is a cross-sectional view of the truncated conical protrusions.

Further, in each of the mark indicating portions 3, as shown in FIGS. 4A and 4B, it is preferred that a surface (s) which is either the reference surface (x) or the surface (4s) of each of the marks 4 is provided with a plurality of small protruding portions 15 each protruding from the surface (s). In this embodiment, a case where each of the small protruding portions 15 is a truncated conical protrusion 16 having a smaller diameter on a side of an upper end thereof is shown. It is preferred that each of the truncated conical protrusions 16 has a maximum diameter (D1) in the range of from 50 to 1000 micro meters and a protruding height (H1) from the surface (s) in the range of from 50 to 1000 micro meters, and that a distance (L1) between centers of the small protruding portions 15 adjacent to each other is in the range of from 200 to 1000 micro meters.

It is possible that the truncated conical protrusions 16 configured as such irregularly reflect light and make the surface (s) (the reference surface (x) or the surface (4s) of the mark 4) look black. Thereby, it is possible that the contour shapes of the marks 4 are made clearer, therefore, it is possible that the legibility of the marks 4 is further improved. As a result of research by the present inventor, when the maximum diameter (D1) and the protruding height (H1) of each of the truncated conical protrusions 16, and the distance (L1) of the truncated conical protrusions 16 are outside the above ranges, the surface (s) looks whitish due to the reflection of light, therefore, the contrast difference between the marks 4 and the reference surface (x) tends to be decreased. Note that by configuring each of the small protruding portions 15 to have a truncated cone shape, it is possible that the reflection of light is further suppressed while the strength is increased as compared with a cylindrical shape.

In this embodiment, a case is shown in which the truncated conical protrusions 16 are arranged in a grid pattern, but they may be arranged in a staggered pattern, or may be randomly arranged as long as the distance (L1) satisfies the above range.

Figure 5A:
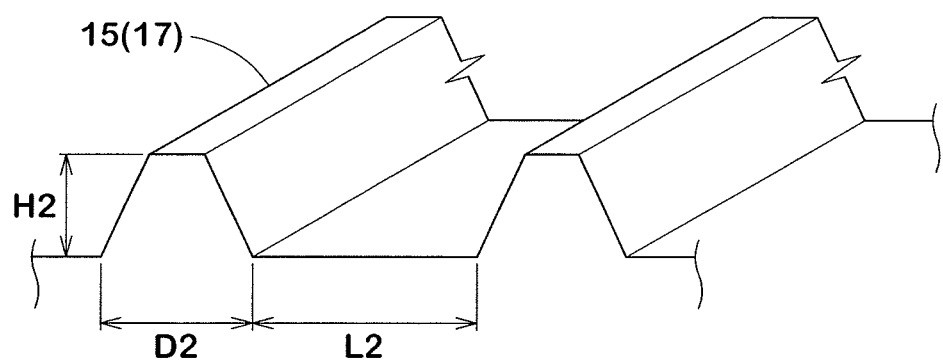
FIG. 5A is a partial perspective view showing an arrangement and cross sections of the small protruding portions formed as rib-shaped protrusions.
Figure 5B:
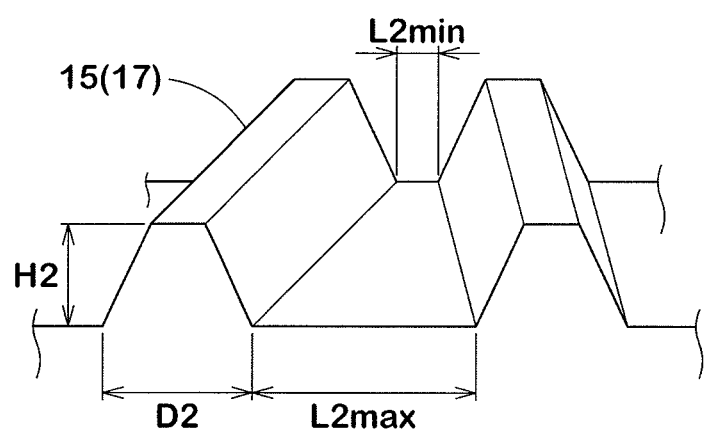
FIG. 5B is a partial perspective view showing another arrangement and the cross sections of the small protruding portions formed as the rib-shaped protrusions.

FIGS. 5A and 5B show another embodiment of the small protruding portions 15. In this embodiment, a case is shown where each of the small protruding portions 15 is a rib-shaped protrusion 17 having a trapezoidal cross section with a thickness thereof decreasing toward an upper end thereof. The rib-shaped protrusions 17 can be arranged parallel to each other as shown in FIG. 5A, or they can be arranged so as not to be parallel to each other (non-parallel) as shown in FIG. 5B. It is preferred that each of the rib-shaped protrusions 17 has a maximum thickness (D2) in the range of from 20 to 1000 micro meters and a protruding height (H2) in the range of from 200 to 500 micro meters, and that a distance (L2) between the rib-shaped protrusions 17 adjacent to each other is in the range of from 10 to 800 micro meters. Note that in a case where the rib-shaped protrusions 17 are arranged in the non-parallel manner, it is preferred that an average value of a maximum value (L2max) and a minimum value (L2min) of the distance (L2) is in the range of from 10 to 800 micro meters.

As is the case with the truncated conical protrusions 16, it is possible that the rib-shaped protrusion 17 irregularly reflect light and make the surface (s) (the reference surface (x) or the surface (4s) of the mark 4) look black. Thereby, it is possible that the contour shapes of the marks 4 are made clearer, therefore, it is possible that the legibility of the marks 4 is further improved. As a result of research by the present inventor, when the maximum thickness (D2) and the protruding height (H2) of each of the rib-shaped protrusions 17, and the distance (L2) of the rib-shaped protrusions 17 are outside the above ranges, the surface (s) looks whitish due to the reflection of light, therefore, the contrast difference between the marks 4 and the reference surface (x) tends to be decreased. Note that, from a point of view of the contrast, it is more preferred that the rib-shaped protrusions 17 are arranged in the non-parallel manner.

In each of the mark indicating portions 3, it is possible that the marks 4 are directly formed on the surface (2s) of a respective one of the sidewall portions 2 without having the base portion 5 formed thereon. In this case, the surface (2s) of the sidewall portion 2 forms the reference surface (x). In this case, in order to distinguish the mark indicating portions 3 from other portions, it is preferred that the surface (2s) of each of the sidewall portions 2 is provided with a rib and the like having a small height and surrounding each of the mark indicating portions 3.

While detailed description has been made of the tyre as especially preferred embodiments of the present invention, the present invention can be embodied in various forms without being limited to the illustrated embodiments.

Working Examples (Examples)

Tyres provided with the mark indicating portions on the surfaces of the sidewall portions were made by way of test according to the specifications listed in Table 1, and then the legibility of the marks was compared. The height (H5) of the base portion was the same for all of the test tyres, and the height (H) (the maximum height (Hmax) if the surface of each of the marks was inclined) of each of the marks from the surface (the reference surface (x)) of the base portion was the same for all of the test tyres.

In Reference 1, each of the marks had a constant height from the base portion. In Examples 2 to 5, the small protruding portions were formed on the surfaces of the marks. In the Examples 2 and 3, the small protruding portions were the truncated conical protrusions each having the maximum diameter (D1) of 320 micro meters and the protruding height (H1) of 500 micro meters, and the distance (L1) was 400 micro meters. In the Examples 4 and 5, the small protruding portions were the rib-shaped protrusions each having the maximum thickness (D2) of 160 micro meters and the protruding height (H2) of 200 micro meters, and the distance (L2) was 200 micro meters.

The legibility was evaluated by a visual observation and the evaluation is indicated by an index based on the Reference 1 being 100, wherein a larger numerical value is better.

surface increasing outwardly in a tire radial direction from an inner end thereof in the tire radial direction, and a second inclined surface portion having a height from the reference surface increasing inwardly in the tire radial direction from an outer end thereof in the tire radial direction, a middle surface portion extending parallel to the reference surface that is interposed between the first inclined surface portion and the second inclined surface portion, and a width in the tire radial direction of the middle surface portion is not more than 0.2 times a length in the tire radial direction of the entire surface of the or each mark.

2. The tire to claim 1, wherein
a length (La) in the tire radial direction of the first inclined surface portion is in a range of from 0.8 to 1.2 times a length (Lb) in the tire radial direction of the second inclined surface portion.

3. The tire according to claim 1, wherein
in the mark indicating portion, either the reference surface or the surface of the or each mark is provided with a plurality of small protruding portions.

4. The tire according to claim 3, wherein
each of the small protruding portions is a truncated conical protrusion having a smaller diameter on a side of an upper end thereof.

5. The tire according to claim 4, wherein
each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

6. The tire according to claim 1, wherein
the mark indicating portion is provided with a base portion projecting from the surface of the sidewall portion at a constant height, and a surface of the base portion forms the reference surface.

TABLE 1

| <Mark indicating portion> | Ref. 1 | Ex. 1 | Ex. 2 | Ex. 3 | Ex. 4 | Ex. 5 |
|---|---|---|---|---|---|---|
| Base portion | | Present | | Absent | Present | |
| Mark | | | | Present | | |
| First inclined surface portion | Absent | | | Present | | |
| Second inclined surface portion | Absent | | | Present | | |
| Ratio of Length (La) and Length (Lb) | — | | | 1 | | |
| Magnitude relation between Maximum height (Hmax) and Height (H5) | | Hmax > H5 | | — | Hmax > H5 | |
| Small protruding portion | Absent | Absent | Truncated conical protrusion | Truncated conical protrusion | Rib-shaped protrusion (parallel) | Rib-shaped protrusion (non-parallel) |
| Legibility | 100 | 108 | 113 | 105 | 130 | 135 |

As shown in Table 1, it was confirmed that the tyres as the Examples showed excellent legibility of the marks.

The invention claimed is:

1. A tire comprising a sidewall portion provided with a mark indicating portion having one or more marks, wherein the mark indicating portion comprises a reference surface provided on a surface of the sidewall portion and the marks formed on the reference surface,
a surface of the or each mark includes a first inclined surface portion having a height from the reference 7. The tire according to claim 6, wherein
a maximum height of the surface of the or each mark from the reference surface is larger than the height of the base portion from the surface of the sidewall portion.

8. A tire comprising a sidewall portion provided with a mark indicating portion having one or more marks, wherein the mark indicating portion comprises a reference surface provided on a surface of the sidewall portion and the marks formed on the reference surface, a surface of the or each mark includes a first inclined surface portion having a height from the reference surface increasing outwardly in a tire radial direction from an inner end thereof in the tire radial direction, and a second inclined surface portion having a height from the reference surface increasing inwardly in the tire radial direction from an outer end thereof in the tire radial direction, a top portion of the surface of the or each mark is formed by a ridge line where the first inclined surface portion and the second inclined surface portion intersect, and the ridge line is curved in an arc shape with a tire axis as a center thereof.

9. The tire to claim 8, wherein
a length (La) in the tire radial direction of the first inclined surface portion is in a range of from 0.8 to 1.2 times a length (Lb) in the tire radial direction of the second inclined surface portion.

10. The tire according to claim 8, wherein
in the mark indicating portion, either the reference surface or the surface of the or each mark is provided with a plurality of small protruding portions.

11. The tire according to claim 10, wherein
each of the small protruding portions is a truncated conical protrusion having a smaller diameter on a side of an upper end thereof.

12. The tire according to claim 11, wherein
each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

13. The tire according to claim 8, wherein
the mark indicating portion is provided with a base portion projecting from the surface of the sidewall portion at a constant height, and a surface of the base portion forms the reference surface.

14. The tire according to claim 13, wherein
a maximum height of the surface of the or each mark from the reference surface is larger than the height of the base portion from the surface of the sidewall portion.

15. The tire according to claim 8, wherein a plurality of the marks is formed on the reference surface.

16. A tire comprising a sidewall portion provided with a mark indicating portion having one or more marks, wherein
the mark indicating portion comprises a reference surface provided on a surface of the sidewall portion and the marks formed on the reference surface, a surface of the or each mark includes a first inclined surface portion having a height from the reference surface increasing outwardly in a tire radial direction from an inner end thereof in the tire radial direction, and a second inclined surface portion having a height from the reference surface increasing inwardly in the tire radial direction from an outer end thereof in the tire radial direction, the mark indicating portion is provided with a base portion projecting from the surface of the sidewall portion at a constant height, a surface of the base portion forms the reference surface, a maximum height of the surface of the or each mark from the reference surface is larger than the height of the base portion from the surface of the sidewall portion, and a minimum height of the surface of the or each mark from the reference surface is not more than the height of the base portion.

17. The tire to claim 16, wherein
a length (La) in the tire radial direction of the first inclined surface portion is in a range of from 0.8 to 1.2 times a length (Lb) in the tire radial direction of the second inclined surface portion.

18. The tire according to claim 16, wherein
in the mark indicating portion, either the reference surface or the surface of the or each mark is provided with a plurality of small protruding portions.

19. The tire according to claim 18, wherein
each of the small protruding portions is a truncated conical protrusion having a smaller diameter on a side of an upper end thereof.

20. The tire according to claim 19, wherein
each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

\* \* \* \* \*